United States Patent [19]
Kuwayama et al.

[11] Patent Number: 5,455,691
[45] Date of Patent: Oct. 3, 1995

[54] METHOD OF MAKING A HOLOGRAM

[75] Inventors: Tetsuro Kuwayama, Yokohama; Yasuo Nakamura, Tokyo, both of Japan

[73] Assignee: Canon Kabushiki Kaisha, Tokyo, Japan

[21] Appl. No.: 232,413

[22] Filed: Apr. 25, 1994

Related U.S. Application Data

[63] Continuation of Ser. No. 995,920, Dec. 22, 1992, abandoned, which is a continuation of Ser. No. 857,103, Mar. 24, 1992, abandoned, which is a continuation of Ser. No. 740,873, Jul. 31, 1991, abandoned, which is a continuation of Ser. No. 532,122, Jun. 4, 1990, abandoned, which is a continuation of Ser. No. 235,699, Aug. 22, 1988, abandoned, which is a continuation of Ser. No. 732,836, May 10, 1985, abandoned.

[30] Foreign Application Priority Data

May 18, 1984 [JP] Japan ..................................... 59-98640

[51] Int. Cl.$^6$ ................................ G03H 1/10; G02B 5/32
[52] U.S. Cl. ................................ 359/10; 359/15; 359/35; 359/900
[58] Field of Search ..................................... 350/3.83, 3.7, 350/3.77, 320; 359/30, 15, 24, 900, 1, 10, 32, 35

[56] References Cited

U.S. PATENT DOCUMENTS

| | | | |
|---|---|---|---|
| 3,666,345 | 5/1972 | Maslowski | 350/3.7 |
| 4,465,332 | 8/1984 | Horner et al. | 350/3.7 |
| 4,469,407 | 9/1984 | Cowan et al. | 350/3.7 |
| 4,530,564 | 7/1985 | Close | 350/3.72 |

FOREIGN PATENT DOCUMENTS 74708 1/1982 Japan.

Primary Examiner—William L. Sikes
Assistant Examiner—David R. Parsons
Attorney, Agent, or Firm—Fitzpatrick, Cella, Harper & Scinto

[57] ABSTRACT

This specification discloses a method of making a hologram imaged substantially without aberrations during the use when the wavelength of a light during the making differs from the wavelength of a light during the use and having high diffraction efficiency. In order to eliminate any aberration occuring when the hologram is used in a light beam of a different wavelength and to obtain high diffraction efficiency, a making light beam is caused to enter a predetermined coaxial optical system from outside the axis thereof to impart a suitable aberration, and a hologram is formed on a hologram sensitive material by the making light beam.

5 Claims, 5 Drawing Sheets

METHOD OF MAKING A HOLOGRAM

This application is a continuation of application Ser. No. 07/995,920 filed Dec. 22, 1992, now abandoned, which in turn is a continuation of application Ser. No. 07/857,103 filed Mar. 24, 1992, now abandoned, which in turn is a continuation of application Ser. No. 07/740,873 filed Jul. 31, 1991, now abandoned, which in turn is a continuation of application Ser. No. 07/532,122 filed Jun. 4, 1990, now abandoned, which in turn is a continuation of application Ser. No. 07/235,699, filed Aug. 22, 1988, now abandoned, which in turn is a continuation of application Ser. No. 06/732,836, fled May 10, 1985, now abandoned.

BACKGROUND OF THE INVENTION

1. Field of the Invention

This invention relates to a method of making a hologram, and in particular to a method of making a hologram imaged substantially without aberrations during use when the wavelength of light in making the hologram differs from the wavelength of light during the use and having high diffraction efficiency.

2. Description of the Prior Art

A hologram lens can be obtained by making a hologram of a point source of light by the use of the holography technique. The hologram lens is of planar shape and has advantages that it is a thin film lens having a thickness of the order of several microns and that a number of lenses can be mass-produced on the same flat plate by the step-and-repeat method. Therefore, the utilization of the hologram lens as an optical element in an optical system utilizing a laser light, such as the condensing lens of the optical head of an optical disc device or a collimation lens for converting the divergent light beam from a semiconductor laser into a parallel light beam, has been proposed.

The optical system of the optical head portion of the optical disc device is such that a condensing hologram lens is disposed on the front surface side of a disc substrate so as to read through the disc substrate a signal recorded on the back surface of a plastic plate usually of a thickness of the order of 1.1 mm which is the disc substrate. The hologram lens is disposed with an air space of the order of 1 mm with respect to the disc substrate so that no collision is caused by vibration of the disc, and a cover glass or protective layer of a suitable thickness is interposed therebetween to prevent adherence of dust or the like to the hologram lens.

An example of the optical system for making the hologram lens used in such an optical system is shown in FIG. 1 of the accompanying drawings. In FIG. 1, part of a monochromatic light 2 emitted from a laser light source 1 is transmitted through a half-mirror 3, is reflected by a reflecting mirror 4 and is condensed in a pin-hole 16 by a microscope objective lens 15, and the light transmitted through the pin-hole 16 is transmitted through a collimation lens 17 and becomes a parallel light beam 18, which is transmitted through a parallel flat plate 9 and enters a hologram sensitive material 11 applied to a hologram substrate 10. This is a reference light. On the other hand, the light beam reflected by the half-mirror 3 is reflected by a reflecting mirror and is condensed in a pin-hole 8 by a microscope objective lens 7, and the light transmitted through the pin-hole 8 becomes a divergent light beam 12, which is transmitted through the parallel flat plate 9 and enters the hologram sensitive material 11. This is an object light. The object light beam 12 is made into a divergent light beam having spherical aberration by the parallel flat plate 9, and this light beam and the reference light beam form interference fringes at the position of the hologram sensitive material 11, and these interference fringes are recorded on the hologram sensitive material 11. By developing this, there is obtained a hologram lens.

Where the hologram lens thus made is used, a laser light of the same wavelength as that of the laser light used during the forming of the hologram lens is made into a parallel light beam at the same angle as the parallel light beam 18 but in the reverse direction and is caused to enter the hologram 11. The light diffracted by the hologram 11 becomes a convergent light beam having the spherical aberration imparted to the object light during the making and, after this has been transmitted through the cover glass and the disc substrate, a light spot is produced at a position corresponding to the pin-hole 8 during the making of the hologram.

Thus, by using light of the same wavelength during the making and during the use, complete wave surface reproduction can be accomplished by the hologram lens substantially without aberrations.

Particularly, where a volume type phase hologram is made with bichromate gelatine or the like used as the hologram sensitive material 11, the diffraction efficiency of the hologram can be improved up to approximately 100% and the utilization efficiency of light becomes sufficient.

Presently, it is preferable that a compact, light-weight semiconductor laser requiring no special modulator be used as the light source in an optical system using a hologram. The oscillation wavelength range of such a semiconductor laser is usually from the near-infrared range to the infrared range (0.78 μm or more). Accordingly, where the making of the hologram lens as described above and the image reproduction using the same are to be effected by the use of such semiconductor laser, it is necessary to use a hologram sensitive material having effective sensitivity at 0.78 μm or more. As a hologram sensitive material having sensitivity in this wavelength range, there is a silver salt sensitive material sensitized by infrared light. However, the hologram made by the use of this sensitive material is an absorption type hologram and therefore has the disadvantage that its diffraction efficiency is as low as several %. By means of bleaching, the diffraction efficiency may be improved to a certain degree, but there is a limit to this.

Accordingly, to improve the diffraction efficiency, it is necessary to adopt a volume type phase hologram, and the aforementioned bichromate gelatine is typical as a sensitive material used for making of such a hologram, but in this sensitive material, the effective sensitivity area is up to green light having a maximum wavelength of 0.55 μm, and it is merely possible to endow such sensitive material with the sensitivity up to red light of 0.6 μm even if special pigment sensitization is effected thereon. Further, a volume type hologram sensitive material having effective sensitivity in the near-infrared range and the infrared range is not yet known.

Therefore, no semiconductor laser can be used during the making of a volume type phase hologram, but a laser of a shorter wavelength is used. When the hologram made in this manner is used in an optical system using a semiconductor laser, the wavelength of light differs during the making and during the use and therefore, it is not imaged without aberrations and thus, in some cases, aberration correction becomes necessary.

Further, in the hologram making optical system as shown in FIG. 1, the parallel flat plate 9 is disposed immediately forwardly of the hologram sensitive material 11, and this results in creation of harmful ghost images. That is, a light beam 13 resulting from part of the object wave light beam 12 being reflected by a second surface and then a first surface of the parallel flat plate 9 or a light beam 13' resulting from part of the object wave light beam 12 being reflected by the surface of the hologram sensitive material 11 and then the second surface of the parallel flat plate 9 enters the hologram sensitive material 11, whereby harmful ghost images are recorded. These ghost images are reproduced during the use of the hologram lens and may thus result in creation of unnecessary ghost light and reduction in diffraction efficiency.

For the reasons set forth above, it has been difficult in the conventional making method to make a hologram used in a light of a wavelength different from the wavelength of the light during the making. However, there is a method in which, as shown, for example, in Japanese Laid-open Patent Application No. 74708/1982, a suitable aberration is pre-imparted to a hologram making light beam and a hologram is made so that there is no aberration when it is used in a different wavelength, but in this case, the optical system for imparting a suitable aberration is not coaxial and use has been made of such means as inclining the optical element. Accordingly, the designing of such optical system for making a hologram has been very cumbersome and has required much labor and, when it is to be actually disposed, strict positional accuracy has been required and therefore, the setting thereof has also required much labor.

SUMMARY OF THE INVENTION

In view of the above-described prior art, it is an object of the present invention to provide a hologram making method which is capable of imaging a light substantially without aberrations during the use and making a hologram having high diffraction efficiency when the wavelength of a light during the making of the hologram differs from the wavelength of a light during the use of the hologram and which enables an apparatus for making the hologram to be easily obtained and readily permits the setting of the apparatus.

The present invention achieves the above object by causing a making light beam to enter from outside the axis of a coaxial optical system, imparting a suitable aberration to said making light beam in advance by said coaxial optical system, and making a hologram so as to produce a predetermined diffracted light at each point of the hologram during the use and to substantially satisfy the Bragg condition at said each point.

Said coaxial optical system comprises an optical element such as a conventional spherical lens, a non-spherical lens or a cylindrical lens and constitutes rotation-symmetrical optical system or a rotation-symmetrical optical system. Accordingly, where said coaxial optical system is to be designed in order to impart a suitable aberration such as coma or astigmatism to said making light beam, the designing can be accomplished as simply as the conventional optical designing and the setting of the optical element is also easy.

Also, where two light beams, i.e., the object wave light beam and the reference wave light beam, are used as said making light beam, a hologram can be ideally made by substantially equalizing the intensities of the object wave light beam and the reference wave light beam in the hologram sensitive material.

DESCRIPTION OF THE PREFERRED EMBODIMENT

In order to describe the present invention in detail, the Bragg condition in a volume type hologram will hereinafter be described by reference to Tosihiro Kubota, "A Study on the Characteristic and Applications of Lipman Hologram" (Tokyo University Production Technology Institute Report Vol. 30, No. 2, February 1982).

Figure 1:
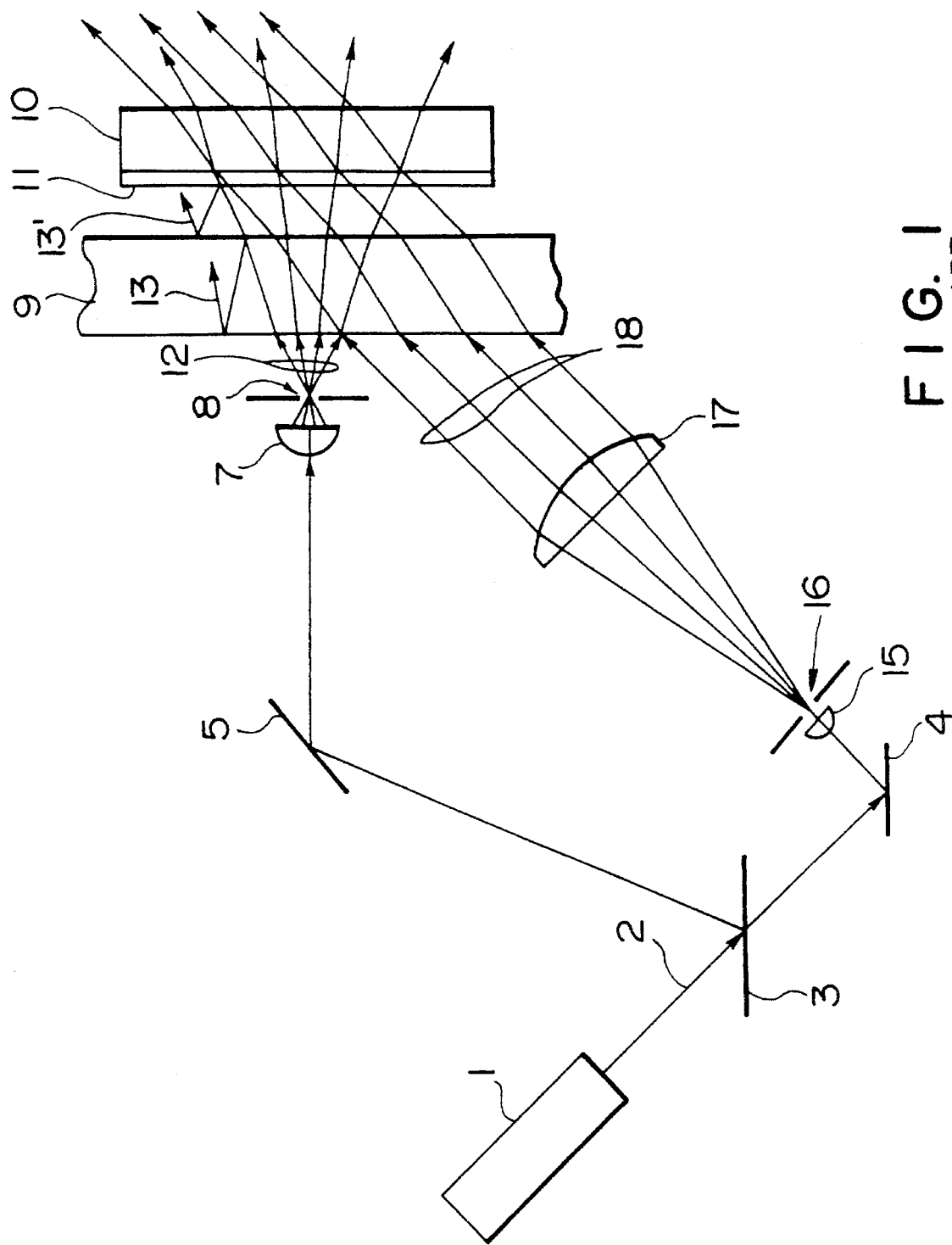
FIG. 1 shows a hologram making optical system according to the prior art.
Figure 2:
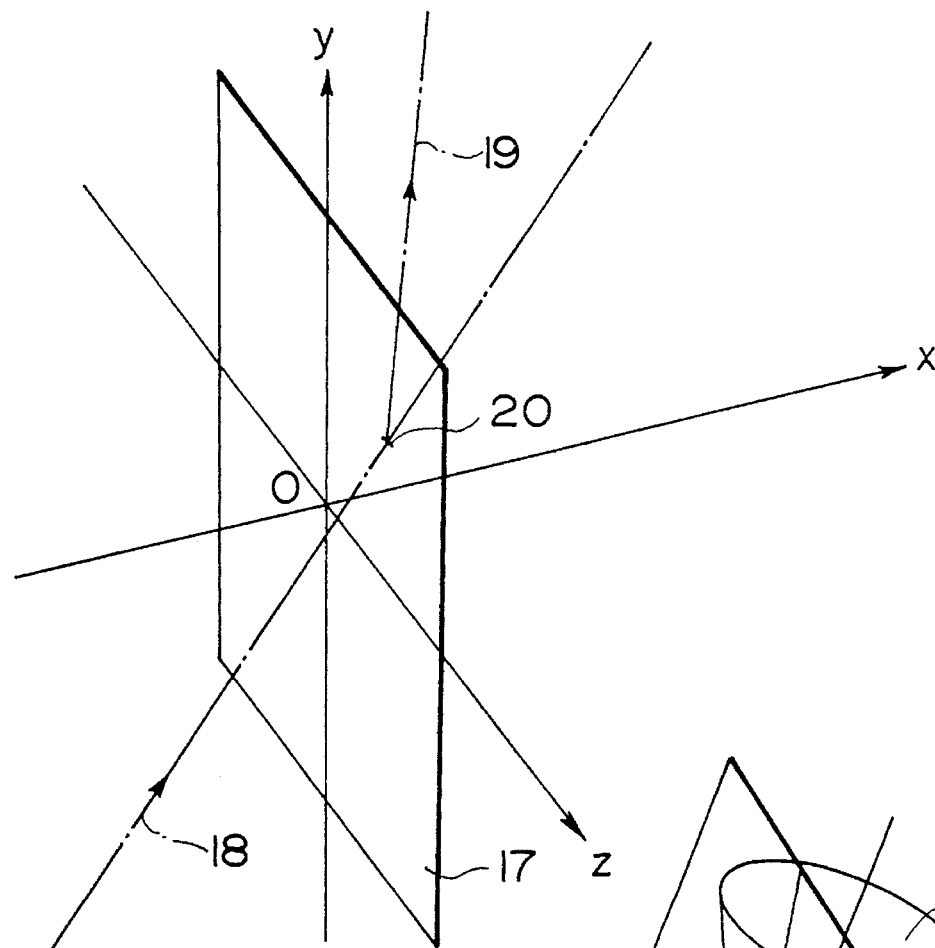
FIG. 2 shows the diffraction of light by a hologram.

FIG. 2 shows the manner in which an incident light ray is diffracted by a volume type hologram. When the coordinate system is plotted as shown and the unit vectors in the directions of the incident light 18 and the diffracted light 19 are $X_c$ ($l_c$, $m_c$, $n_c$) and $X_i$ ($l_i$, $m_i$, $n_i$), respectively, and the pitch of the interference fringes in the hologram 17 at the point of incidence 20 (y,z) of the incident light 18 onto the hologram 17 is $P_x$, $P_y$, $P_z$ and the wavelengths of the incident light 18 and the diffracted light 19 are $\lambda_c$ and the refractive index of the hologram 17 is $N_c$, the incident light 18 and the diffracted light 19 satisfy the following grating equations:

$$P_y(m_c - m_i) = \lambda_c / N_c \qquad (1.1)$$

$$P_z(n_c - n_i) = \lambda_c / N_c$$

$$l_i = \pm \sqrt{1 - (m_i^2 + n_i^2)} \qquad (1.3)$$

When $l_i$ is of the same sign as $l_c$, it shows the transmission type, and when $l_i$ is of the sign different from $l_c$, it shows the reflection type.

The diffraction efficiency of the diffracted light 19 decreases as the amount of deviation from the Bragg condition becomes greater. When the wave number vectors of the incident light 18 and the diffracted light 19 are $\rho$ and $\omega$, respectively, and the wave number thereof is $k_c$ and the inverted grating vector of the hologram 17 is $K_c$, there is established the following relation between these amounts:

$$\omega = \rho - K_c - \Delta k \qquad (2.1)$$

where $\Delta k$ is a vector having only an x component, and this is an amount representative of the measure of the deviation from the Bragg condition. The condition expressed by equation (2.1) when $\Delta k=0$ is called the Bragg condition. These amounts can be expressed as follows:

$$\omega = k_c X_i \qquad (2.2)$$

$$\rho = k_c X_c \qquad (2.3)$$

$$1/P_c^2 = 1/P_x^2 + 1/P_y^2 + 1/P_z^2 \qquad (2.4)$$

$$K_c \equiv |K_c| = 2\pi/P_c \qquad (2.5)$$

$$\Delta k = k_c(l_c - l_i) - k_c(l_r - l_o)/M_x \qquad (2.6)$$

$$k_c = 2\pi N_c/\lambda_c \quad (2.7)$$

$$k_e = 2\pi N_e/\lambda_e \quad (2.8)$$

where $k_e$, $\lambda_e$ and $N_e$ are the wave number and wavelength of the light and the refractive index of the hologram sensitive material, respectively, during the making of the hologram, $P_c$ is the pitch of the interference fringes at the point of incidence 20, $|K_c|$ is the norm of $K_c$, and $l_r$ and $l_o$ are the x component of the unit vectors $X_r$ ($l_r$, $m_r$, $n_r$) and $X$ ($l_o$, $m_o$, $n_o$) in the directions of the reference light and the object light at points (y,z) during the use of the hologram. $M_x$ is the rate of variation in dimensions in x direction caused by the developing process or the like of the hologram. Likewise, the rates of variation in dimensions in y direction and z direction are represented by $M_y$ and $M_z$, respectively, and these are called the shrinkage. $\Delta k$ is the measure of the deviation from the Bragg condition, and the amplitude intensity of the diffracted light is maximum when $\Delta k$ is zero.

From what has been described above, it will be seen that to obtain a formed image substantially free of aberrations and high diffraction efficiency during the use, a hologram making light beam may be made so that the diffracted light ray by the diffraction at each point of the hologram determined by equations (1.1)–(1.3) is imaged without aberrations and further the Bragg condition is satisfied at each point of the hologram. Accordingly, consideration will hereinafter be given to a light beam which satisfies equation (2.1) under the condition of $\Delta k=0$. If $\Delta k=0$ is given in equation (2.1), $$\omega = p - K_c \quad (2.1.1)$$

Figure 3:
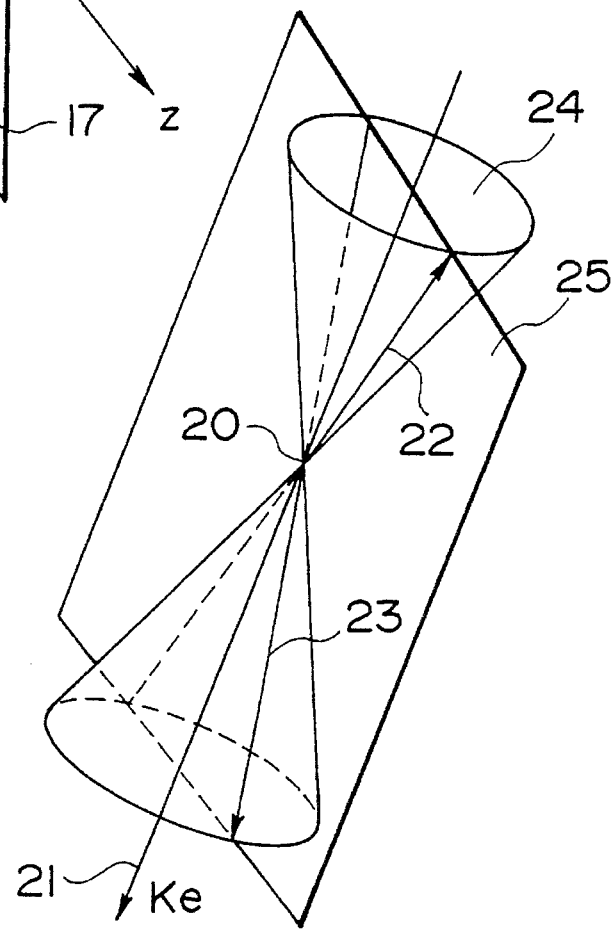
FIG. 3 shows the direction of light during the making of the hologram.

Since equations relating to the y component and the z component of equation (2.1.1) are equations (1.1) and (1.2), the inverted grating vector which satisfies grating equations (1.1)–(1.3) at each point of the hologram so as to image substantially without aberrations during the use and satisfies the Bragg condition equation (2.1.1) is nothing but $K_c$ which satisfies equation (2.1.1). Accordingly, the making light beam may be determined so as to satisfy equation (2.1.1) at each point of the hologram. The determination of the making light beam will hereinafter be described by reference to FIG. 3. In FIG. 3, reference numerals 22 and 23 designate the wave number vectors R and O, respectively, of the reference light and the object light. Reference numeral 21 denotes the inverted grating vector $K_e$ of the interference fringes formed by R and O. When the pitch of the interference fringes during the making of the hologram is $P_e$ and $K_e$ is the norm of $k_e$, and $V_e$ is the unit vector of $k_e$, the following equation are established:

$$K_e \equiv |k_e| = 2\pi P_e \quad (3.1)$$

$$1/P_e^2 = 1/P_{xe}^2 + 1/P_{ye}^2 + 1/P_{ze}^2 \quad (3.2)$$

where $P_{xe}$, $P_{ye}$, and $P_{ze}$ are the grating pitch during the making. If the unit vector of $k_c$ is $V_c$, $V_c$ is as follows:

$$V_c = \left(\frac{P_c}{\lambda_c} N_c\right) \cdot (X_c - X_i) \quad (3.3)$$

where $$P_c = \lambda_c/N_c \sqrt{2(1 - X_c \cdot X_i)} \quad (3.4)$$

Next, with the shrinkage taken into account, $V_e$ ($l_{ve}$, $m_{ve}$, $n_{ve}$) may be found from $V_c$ ($l_{vc}$, $m_{vc}$, $n_{vc}$) as follows:

$$m_{ve} = \text{Sign}(m_{vc}) \cdot [1 + (l_{vc}M_y/m_{vc}M_x)^2 + (n_{vc}M_y/m_{vc}M_z)^2]^{-\frac{1}{2}}$$

$$n_{ve} = \text{Sign}(n_{vc}) \cdot [1 + (l_{vc}M_z/n_{vc}M_x)^2 + (m_{vc}M_z/n_{vc}M_y)^2]^{-\frac{1}{2}}$$

$$l_{ve} = \pm \sqrt{1 - (m_{vc}^2 + n_{vc}^2)} \quad (3.5)$$

Here, it is to be understood that $l_{ve}$ is of the same sign as $l_{vc}$ in the case of the transmission type and $l_{ve}$ is of the sign different from that of $l_{vc}$ in the case of the reflection type.

R and O for preparing this $V_e$ can be calculated by the use of the following equations:

$$V_{e1} = (R \times O)/|R \times O| \quad (3.6.1)$$

$$V_{e2} = (R + O)/|R + O| \quad (3.6.2)$$

$$V_e = (V_{e1} \times V_{e2})/|V_{e1} + V_{e2}| \quad (3.6.3)$$

If equation (3.6.3) is arranged by substituting thereinto equations (3.6.1) and (3.6.2), the following equation is obtained:

$$V_e = (O - R)/|O - R| \quad (3.6.4)$$

On the other hand, the pitch $P_e$ of the interference fringes during the making is determined by the following equation:

$$P_e = (l_{vc}/l_{ve}) \cdot (1/M_x) \cdot P_c \quad (3.6.5)$$

By the use of equations (3.6.4) and (3.6.5), the inverted grating vector $K_e$ is found as follows:

$$K_e = \frac{2\pi}{P_e} \cdot V_e$$

The relative relation between R and O is determined by equation (3.6.4). This state is shown in FIG. 3. The cone 24 of FIG. 3 is determined by equation (3.6.4), but has a degree of freedom of rotation relative to $V_e$ axis 21. The reference light 22 and the object light 23 must be in the same plane 25. Also, at this time, the inverted grating vector is in the same plane 25.

There are various methods of continuously determining the directions of the localized reference light 22 and object light 23 in the hologram over the whole surface of the hologram, and as seen, for example, from FIG. 3, the plane 25 containing the inverted grating vector $K_e$ may be determined primarily and over the whole surface of the hologram. For that purpose, a continuous vector field may be found over the whole surface of the hologram passing through the origin 20 of $K_e$, and for example, a unit vector field in the direction of the x-axis or a divergent vector field having a source on the surface of the hologram is a good example of it.

Figure 4:
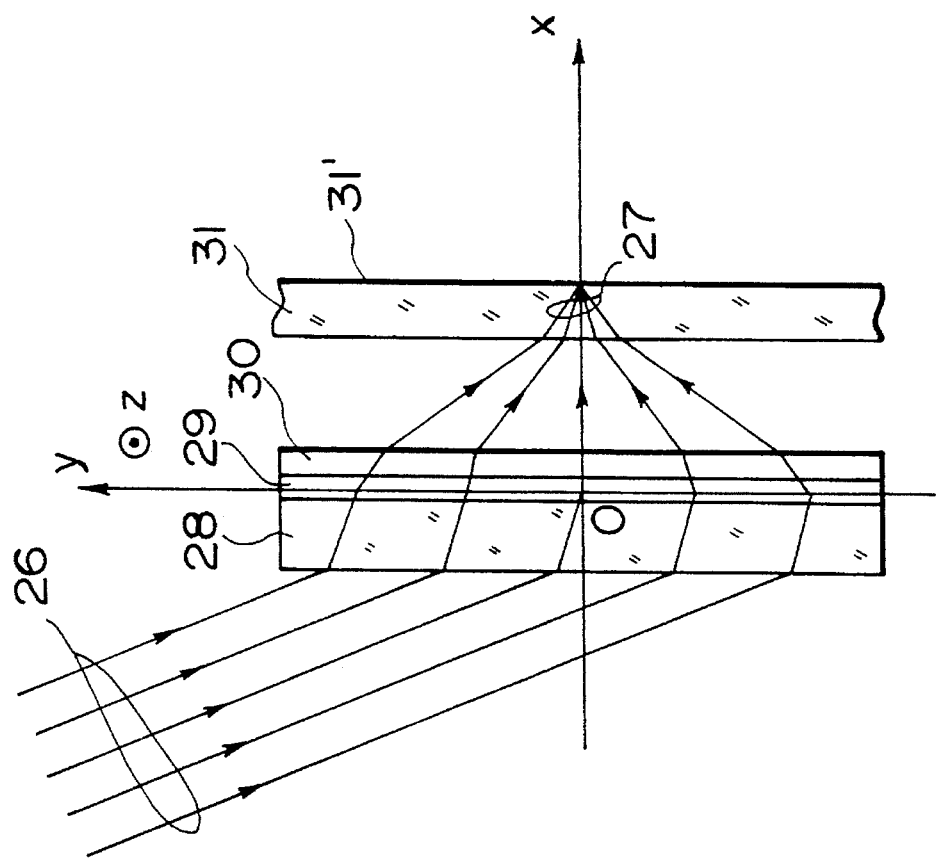
FIG. 4 shows an optical system during the use of a hologram lens.

FIG. 4 shows an optical system in a case where a hologram lens is used in the optical head portion of an optical disc device. In FIG. 4, a parallel light beam 26 of wavelength $\lambda_c$ enters a hologram substrate 28, is diffracted by about 100% by a hologram 29, passes through a cover glass or protective film 30 into the air, becomes a converged light beam 27 and is condensed on the back 31' of a disc 31.

Figure 5:
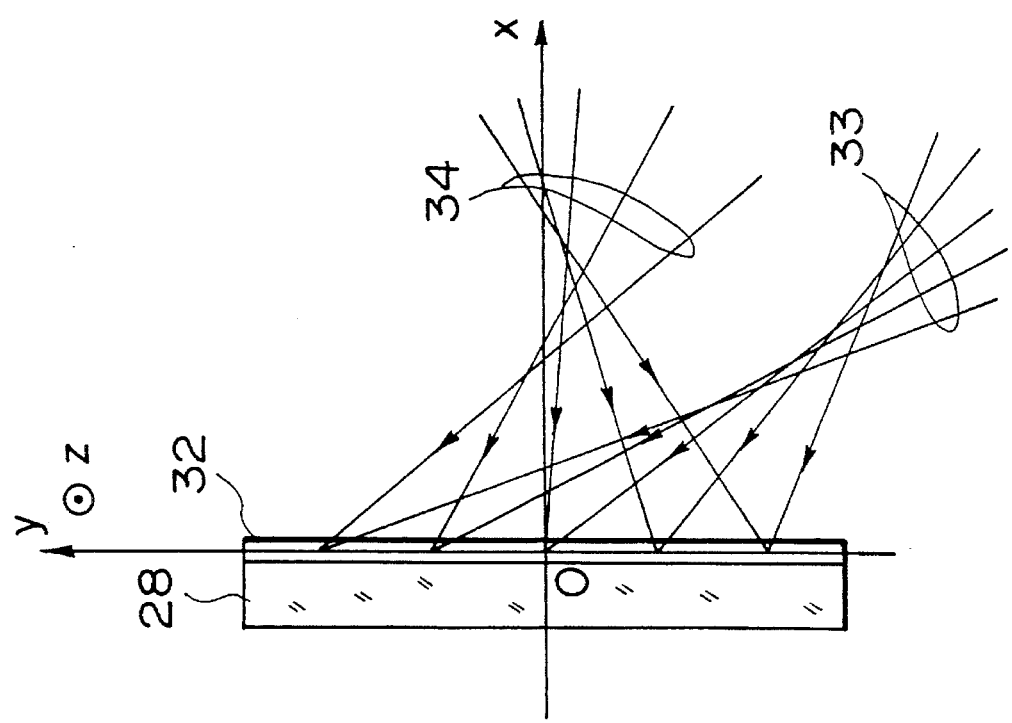
FIGS. 5,6 and 7 show the optical system during the making of the hologram lens.

FIG. 5 shows an optical system for making the hologram used in the optical system of FIG. 4. In FIG. 5, a reference wave light beam 33 of wavelength $\lambda_e$ and an object wave light beam 34 are caused to enter a hologram sensitive material 32. The reference wave light beam 33 and the object wave light beam 34 are the reference light R and the object light O having the same azimuth angle as the inverted grating vector $K_e$ at each point of the hologram as described above. As a method of making such light beams, there is a method using a conventional lens system.

Description will hereinafter be made of the method using a conventional lens system.

Figure 6:
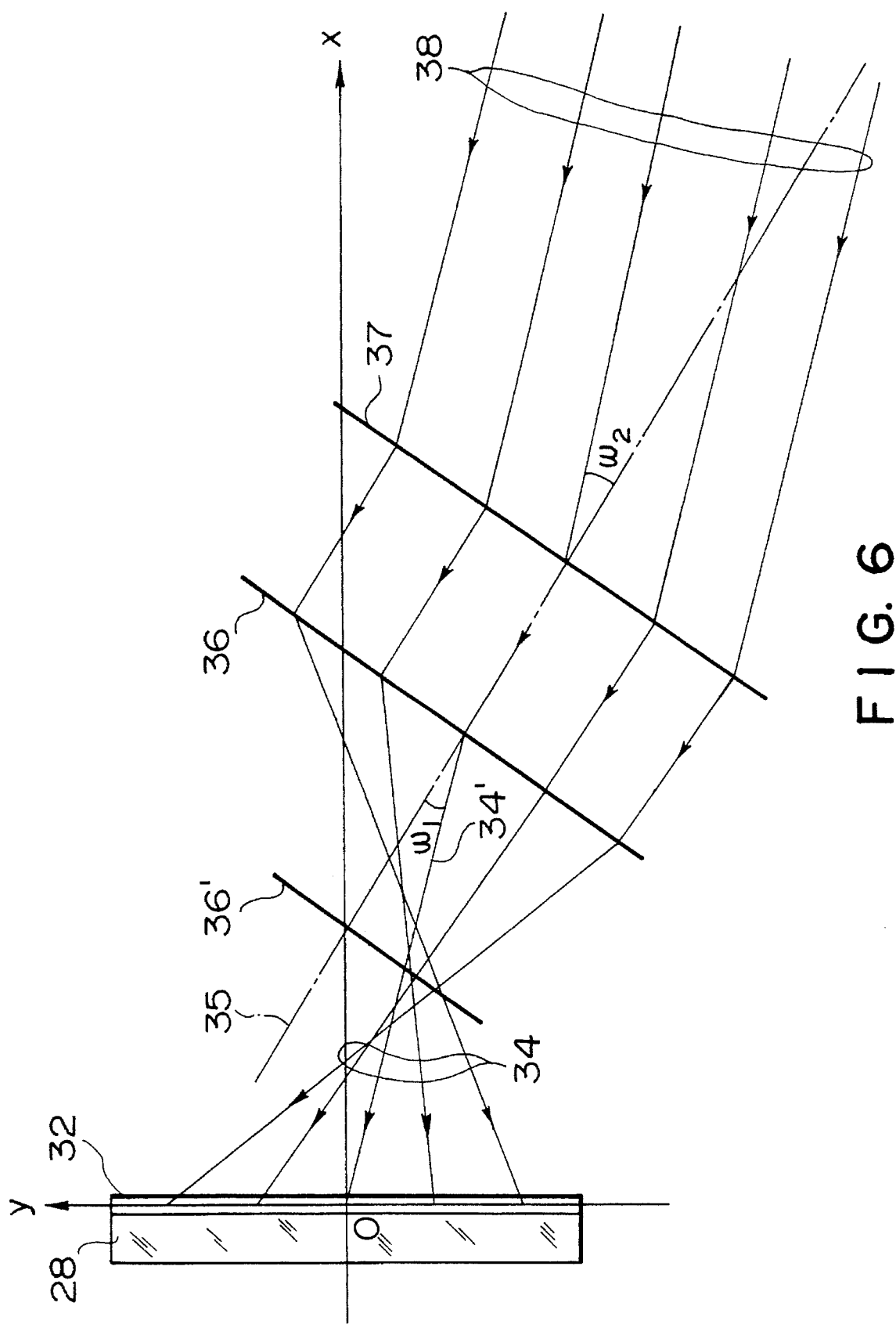

The method of making the reference wave light beam and the method of making the object wave light beam are identical to each other and therefore, only the method of making the object wave light beam will be described herein and making an intended wave surface by controlling the off-axis aberration of a spherical or non-spherical lens will be considered. In FIG. 6, a reference plane 36 is set in a portion of the object wave light beam (including also the other skew light rays than the meridional plane) 34 in which no caustic line is produced, and this is defined as the image side principal plane of the lens system. The object side principal plane 37 is set at a suitable position, and the angle formed between the normal 35 to the two principal planes and the central light ray 34' of the object wave light beam 34 to be made is $\omega_1$. Thus, the object wave light beam 34 is formed as a wave surface having the off-axis aberration of a parallel light beam 38 which has entered this optical system at an angle of view $\omega_2$. However, it is to be understood that the image side principal plane 36 is coincident with the exit pupil position and the object side principal plane 37 is coincident with the entrance pupil position. The third-order and fifth-order aberration coefficients are found from the amount of lateral aberration ($\Delta^{y1}$, $\Delta^{z1}$) on the image plane 36' and the pupil coordinates ($\xi$, $\rho$), and the arrangement of the optical system is determined. Thereby, such a lens arrangement which could not be realized by the actual lens system is excluded before the system is designed. The direction of the optic axis of the lens system is the $x^1$-axis, and the coordinate axis in the meridional plane is the $y^1$-axis. Thereafter, an optical system for creating the object wave light beam 34 having a predetermined aberration may be designed by the use of the conventional lens designing technique. At this time, a realizable lens is designed with the reference plane 36 being regarded as the exit pupil.

Examples of the numerical values of the pupil coordinates ($\xi$, $\rho$) and the amount of lateral aberration ($\Delta^{y1}$, $\Delta^{z1}$) will be shown in Tables below. Table 1 below shows the values regarding the object wave light beam, and Table 2 below shows the values regarding the reference wave light beam. Also, the meridional plane and the sagittal plane refer to those on the surface of the hologram. The wavelength of the light during the making was 0.488 μm.

TABLE 1

| Meridional plane | $\epsilon$ | 21.744 | 12.959 | 0 | −12.640 | −20.637 |
|---|---|---|---|---|---|---|
| | $\Delta y^1$ | 0.3044 | 0.1083 | 0 | 0.1181 | 0.340 |
| Sagittal plane | $\epsilon$ | 1.4759 | 0.5570 | 0.0634 | | |
| | $\eta$ | 21.359 | 12.93 | 4.327 | | |
| | $\Delta y^1$ | 0.1246 | 0.0471 | 0.00535 | | |
| | $\Delta z^1$ | −0.0484 | −0.0194 | −0.00501 | | |
| | Focal length | | | 44.5 | | |
| | Angle of view | | | 5° | | |
| | F° No. | | | 1.1 | | |

TABLE 2

| Meridional plane | $\epsilon$ | 21.736 | 14.462 | 0 | −17.937 | −31.182 |
|---|---|---|---|---|---|---|
| | $\Delta y^1$ | 2.291 | 1.6417 | 0 | −2.3170 | −4.270 |
| Sagittal plane | $\epsilon$ | −2.5855 | −1.0358 | −0.1218 | | |
| | $\eta$ | −14.454 | −9.2368 | −3.1841 | | |
| | $\Delta y^1$ | −0.4122 | −0.1651 | −0.01942 | | |
| | $\Delta z^1$ | −0.6039 | −0.4523 | −0.1675 | | |
| | Focal length | | | 110.0 | | |
| | Angle of view | | | 15° | | |
| | F° No. | | | 2.1 | | |

Figure 7:
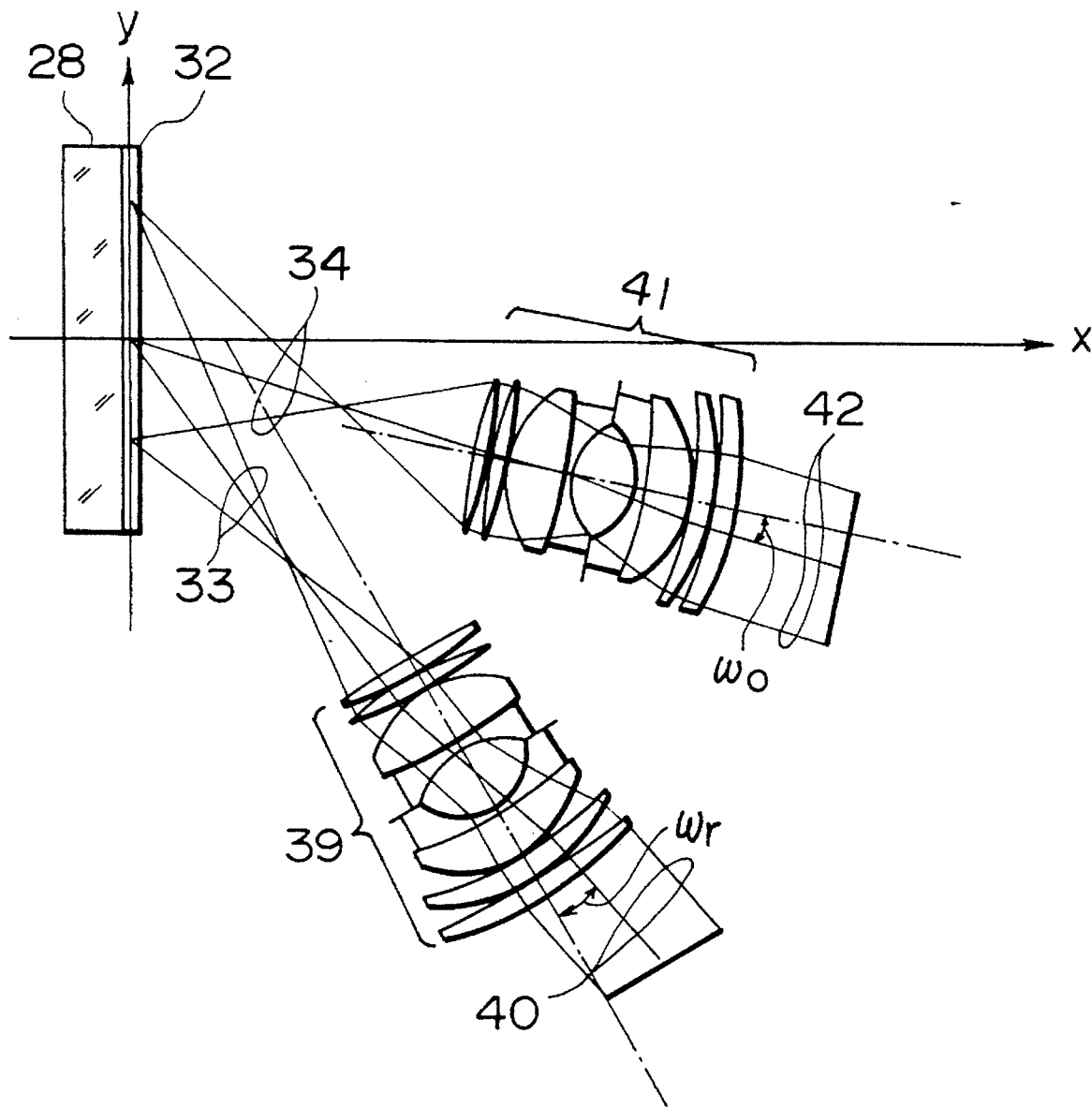

FIG. 7 shows a specific example of the hologram making optical system designed in the manner as described above. A parallel light beam 40 having entered a lens system for reference wave at an angle of view of $\omega_r$ is converted into a reference wave light beam 33. On the other hand, a parallel light beam 42 having entered a lens system 41 for object wave at an angle of view of $\omega_o$ is converted into an object wave light beam 34. The 10 reference wave light beam 33 and the object wave light beam 34 enter a hologram sensitive material 32, and the interference fringes formed there are recorded. By developing this sensitive material, there is obtained a hologram. It is desirable to render the object wave light beam 34 and the reference wave light beam 33 into substantially the same intensity in the hologram sensitive material 32, and for this purpose, suitable means for adjusting the quantity of light can be disposed in the optical system.

In the above-described embodiment, only a hologram lens has been shown as the hologram, but the present invention can also be utilized in making other popular holograms.

In the hologram making method according to the present invention, the procedure as described previously is used to select the used wavelength during the use of the hologram and the making wavelength during the making of the hologram, and by taking into account the required specification and performance of the hologram and the aberration occurring when the hologram is made at said making wavelength and used at said used wavelength, an aberration for correcting said aberration is imparted to the hologram making light beam by a predetermined coaxial optical system, and a hologram is made by said light beam, whereby there can be obtained a hologram having a desired performance.

Accordingly, the present invention is not restricted to the above-described embodiment, but various applications thereof based on the concept of the present invention are conceivable.

What is claimed is:

1. A method of making a hologram to be utilized using a reproducing light beam whose wavelength is different from that of a recording light beam used for making the hologram, comprising:

preparing first and second optical systems, each of said optical systems respectively being a coaxial optical system which has a single continuous optical axis;

setting said first optical system so that reference light beam having an aberration under a first condition is formed by causing the recording light beam to enter said first optical system from outside the optical axis of said first optical system;

setting said second optical system so that an object light beam having an aberration under a second condition is formed by causing the recording light beam to enter said second optical system from outside the optical axis of said second optical system; and, superimposing the reference and object light beams on each other on a photosensitive material on which the hologram is to be formed, the aberrations under said first and second conditions being determined so that no aberration or a predetermined aberration is created at the time of producing a reconstructed light beam from the hologram using the reproducing light beam whose wavelength is different from that of the reference and object light beams.

2. A method according to claim 1, where said coaxial optical system is a rotationally-symmetric optical system.

3. A method according to claim 1, wherein said coaxial optical system is a rotationally-asymmetric optical system.

4. A method according to claim 1, wherein the intensities of said reference and object light beams are substantially the same.

5. An apparatus for making a hologram, comprising:

a substrate for carrying a hologram sensitive material;

a first coaxial optical system for forming a reference light beam having an aberration by using an off-axis light beam; and a second coaxial optical system for forming an object light beam having an aberration by using an off-axis light beam; and wherein the hologram is made by superimposing said reference and object light beams on said hologram sensitive material and the aberrations of said reference and object light beams are determined so that no aberration or a predetermined aberration is created at the time of producing a reconstructed light beam from said hologram.

* * * * *

UNITED STATES PATENT AND TRADEMARK OFFICE
CERTIFICATE OF CORRECTION

PATENT NO. : 5,455,691
DATED : October 3, 1995
INVENTOR(S) : Tetsuro Kuwayama, et. al.

It is certified that error appears in the above-indentified patent and that said Letters Patent is hereby corrected as shown below:

COLUMN 1

Line 21, "light in" should read --light used in--.

COLUMN 4

Line 37, " $P_z(n_c-n_i)=\lambda_c/N_c$ " should read --$P_z(n_c-n_i)=\lambda_c/N_c$--

COLUMN 5

Line 47, "equation" should read --equations--.

COLUMN 6

Line 6, "$1_{yc}$" should read --$1_{vc}$--; and

Line 14, "$|V_{c1}+V_{c2}|$" should read --$|V_{c1} \times V_{c2}|$--.

COLUMN 7

Line 50, "$(\xi,\rho)$" should read --$(\xi,\eta)$--; and

Line 63, "$(\xi,\rho)$" should read --$(\xi,\eta)$--.

COLUMN 8

Table 1, "Meridional $\epsilon$" should read --Meridional $\xi$--; and "Sagittal $\epsilon$" should read --Sagittal $\eta$; and

UNITED STATES PATENT AND TRADEMARK OFFICE
CERTIFICATE OF CORRECTION

PATENT NO. : 5,455,691
DATED : October 3, 1995
INVENTOR(S) : Tetsuro Kuwayama, et. al.

It is certified that error appears in the above-indentified patent and that said Letters Patent is hereby corrected as shown below:

COLUMN 8, Cont'd.

Table 2, ""Meridional $\epsilon$" should read --Meridional $\xi$--; and "Sagittal $\epsilon$" should read --Sagittal $\eta$--.

Signed and Sealed this

Twelfth Day of March, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,455,691
DATED : October 3, 1995
INVENTOR(S) : Tetsuro Kuwayama et al It is certified that error appears in the above-indentified patent and that said Letters Patent is hereby corrected as shown below:

On the title page, item [73] Assignee: should read as follows:

--[73] Assignee: Canon Kabushiki Kaisha, Tokyo, Japan;
Canon Denshi Kabushiki Kaisha, Saitama-ken, Japan--.

Signed and Sealed this

Seventeenth Day of September, 1996

Attest:

BRUCE LEHMAN

*Attesting Officer*     *Commissioner of Patents and Trademarks*